(12) United States Patent
Stuart

(10) Patent No.: US 8,086,499 B2
(45) Date of Patent: Dec. 27, 2011

(54) METHOD AND SYSTEM FOR CONDUCTING AN AUCTION HAVING A PLURALITY OF ONLINE BIDDERS AND SITE BIDDER

(75) Inventor: Gavin Stuart, New South Wales (AU)

(73) Assignee: Commoditiesone Pty Ltd., New South Wales (AU)

( * ) Notice: Subject to any disclaimer, the term of this patent is extended or adjusted under 35 U.S.C. 154(b) by 94 days.

(21) Appl. No.: 12/311,662

(22) PCT Filed: Oct. 9, 2007

(86) PCT No.: PCT/AU2007/001528
§ 371 (c)(1),
(2), (4) Date: Aug. 24, 2009

(87) PCT Pub. No.: WO2008/043138
PCT Pub. Date: Apr. 17, 2008

(65) Prior Publication Data
US 2009/0327096 A1    Dec. 31, 2009

Related U.S. Application Data

(60) Provisional application No. 60/850,967, filed on Oct. 10, 2006.

(30) Foreign Application Priority Data
Oct. 10, 2006    (AU) .................................. 2006905625

(51) Int. Cl.
*G06Q 30/00* (2006.01)
*G06F 17/30* (2006.01)

(52) U.S. Cl. ..................... 705/26.3; 705/26.1; 705/26.41
(58) Field of Classification Search ......... 705/26.1–27.2
See application file for complete search history.

(56) References Cited

U.S. PATENT DOCUMENTS
6,813,612 B1    11/2004    Rabenold et al.
(Continued)

FOREIGN PATENT DOCUMENTS
WO    WO 99/63461    12/1999

OTHER PUBLICATIONS

Christie's takes the online-bidding plunge; Firm is undeterred after rival Sotheby's withdrew from arena Kelly Crow. The Wall Street Journal Asia. Hong Kong: Jul. 13, 2006. p. 28.*

*Primary Examiner* — William Allen
(74) *Attorney, Agent, or Firm* — Harness, Dickey & Pierce, P.L.C.

(57) ABSTRACT

A method, system, server processing system and/or computer program product of conducting an auction having an online bidder and a site bidder, wherein a server processing system is in communication with a client processing system of the online bidder. The method includes: allowing the online bidder and/or site bidder to submit one or more bids prior to a first event, wherein a bid by a online bidder received by the server processing system is considered for acceptance prior to the first event; and in response to the first event: restricting, in the server processing system, a bid being accepted from the online bidder in the auction; and allowing a bid to be submitted by the site bidder in the auction.

18 Claims, 5 Drawing Sheets

U.S. PATENT DOCUMENTS

| | | |
|---|---|---|
| 7,162,446 B1 * | 1/2007 | Handler .......................... 705/37 |
| 2001/0029478 A1 | 10/2001 | Laster et al. |
| 2002/0013763 A1 * | 1/2002 | Harris ............................ 705/38 |
| 2003/0158804 A1 | 8/2003 | Francis et al. |
| 2004/0220821 A1 * | 11/2004 | Ericsson et al. ................. 705/1 |
| 2007/0022040 A1 * | 1/2007 | Gordon .......................... 705/37 |
| 2007/0203734 A1 * | 8/2007 | Whelchel et al. ................. 705/1 |
| 2007/0208652 A1 * | 9/2007 | Whelchel et al. ............... 705/37 |
| 2008/0235115 A1 * | 9/2008 | Stefanovic et al. ............ 705/27 |
| 2010/0287066 A1 * | 11/2010 | Levy et al. ...................... 705/26 |

* cited by examiner

METHOD AND SYSTEM FOR CONDUCTING AN AUCTION HAVING A PLURALITY OF ONLINE BIDDERS AND SITE BIDDER

This application is a National Phase entry of PCT Application number PCT/AU2007/001528 filed on Oct. 9, 2007, which claims priority under at least one of 35 U.S.C. §§119(e), 120 and 365(c) to U.S. Provisional Application No. 60/850,967 filed on Oct. 10, 2006, respectively.

TECHNICAL FIELD

The present invention relates to auctions, and in particular to a method and system of conducting an auction for site and online bidders.

BACKGROUND ART

Auctions have traditionally been conducted on site, in the sense that bidders are physically located at an auction to participate in the auction. For example, auctions in real estate are traditionally conducted outside the property where an auctioneer conducts the auction, and bidders are able to participate in the auction.

In more recent times, with the advent of the Internet, auctions can be held online, where bidders participate in the auction remotely.

However, these auctions suffer from a disadvantage of being limited to allowing only site or only online bidders to participate in the auction. The number of bidders in these auctions is limited as online bidders and site bidders are unable to compete in an auction together. This can lead to a reduction in competition at the auction, which therefore can lead to an unsatisfactory result for the owner of the property, and even the bidders as the property may not meet a reserve value.

There are also complications involved in allowing online bidders and site bidders to compete together in an auction. For example, an online bid may be received just after the property has been sold, yet the online bid may have been submitted by the online bidder prior to the property being sold. This can be a rather difficult situation for the auctioneer to resolve.

Therefore, there is a need for a method and/or system to conduct an auction which allows online and site bidders to compete together.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

DISCLOSURE OF INVENTION

In one broad form there is provided a method of facilitating an auction being conducted having an online bidder and a site bidder, wherein a server processing system is in communication with a client processing system of the online bidder, wherein the method includes, in the server processing system:

receiving one or more bids from the online bidder for acceptance, wherein the online bidder uses the client processing system in order to compete against the site bidder prior to a first event; and restricting a bid being accepted from the online bidder in the auction in response to the first event whilst allowing the site bidder to place a bid.

In one form, the method includes allowing, in the server processing system, the site bidder to submit one or more bids in response to a second event occurring after the first event.

In another form, the method includes restricting the site bidder to submit one or more bids in response to the first event occurring after the second event.

In one embodiment, the second event is a bid being received from a site bidder after the first event.

In another embodiment, the auction includes a plurality of online bidders, wherein the method includes accepting, in the server processing system, one or more bids from at least some of the plurality of online bidders.

In an optional form, the first event is an auction notification during the auction, wherein the method includes, in the server processing system:

receiving input data indicative of the auction notification; and restricting a bid being accepted after receiving the input data.

In another optional form, the first event is a predetermined period of time after an auction notification during the auction, wherein the method includes in the server processing system:

receiving input data indicative of the auction notification; and restricting a bid being accepted from an online bidder in the auction after the period of time has elapsed since receiving the input data.

In one form, the auction notification is an auctioneer announcement during the auction.

In another form, the method includes, in the server processing system, transferring, to the client processing system, data indicative of the auction notification occurring.

In another form, the method includes, in the server processing system, transferring, to the client processing system, data indicative of the period of time.

In one embodiment, the method includes, in the server processing system, transferring, to the client processing system, data indicative of the period of time remaining prior to bids being restricted from being accepted from online bidders.

In another embodiment, the method includes, in the server processing system, transferring, to the client processing system, data indicative of at least one of textual information and graphical information indicative the period of time remaining.

In an optional form, the method includes transferring, from the server processing system to the client processing system, data indicative of the auction being opened.

In another optional form, the method includes the server processing system transferring the data indicative of the auction opening substantially simultaneously with the auction being opened on site.

Optionally, the method includes the server processing system transferring the data indicative of the auction opening after a predetermined period of time after the auction has opened on site.

In another broad form there is provided a method of conducting an auction having an online bidder and a site bidder, wherein a server processing system is in communication with a client processing system of the online bidder, wherein the method includes:

allowing the online bidder and/or site bidder to submit one or more bids prior to a first event, wherein a bid by a online bidder received by the server processing system is accepted prior to the first event; and in response to the first event:
  restricting, in the server processing system, a bid being accepted from the online bidder in the auction; and
  allowing a bid to be submitted by the site bidder in the auction.

In another broad form there is provided a server processing system for conducting an auction having an online bidder and a site bidder, wherein the server processing system is in data communication with a client processing system of the online bidder, wherein the server processing system is configured to:
  receive one or more bids from the online bidder for acceptance, wherein the online bidder uses the client processing system in order to compete against the site bidder prior to a first event; and
  restrict a bid being accepted from the online bidder in the auction in response to the first event whilst allowing the site bidder to place a bid.

In another broad form there is provided a computer program product including a computer readable medium having a computer program recorded therein or thereon, the computer program enabling facilitation of conducting an auction having an online bidder and a site bidder via use of a server processing system, wherein the computer program product configures the server processing system to:
  receive one or more bids from the online bidder for acceptance, wherein the online bidder uses the client processing system in order to compete against the site bidder prior to a first event; and
  restrict a bid being accepted from the online bidder in the auction in response to the first event whilst allowing the site bidder to place a bid.

In another broad form there is provided a system for conducting an auction having an online bidder and a site bidder, wherein the system includes:
  a server processing system is in communication with a client processing system of the online bidder, wherein the server processing system is configured to:
    receive one or more bids from the online bidder for acceptance, wherein the online bidder uses the client processing system in order to compete against the site bidder prior to a first event; and
    restrict a bid being accepted from the online bidder in the auction in response to the first event whilst allowing the site bidder to place a bid.

In one form, the system includes a display device in communication with the server processing system and located on site, wherein the display device is configured to display the accepted bid during the auction.

In another form, the display device is at least one of:
  a television;
  a projector; and
  a graphical displaying device.

According to another broad form, the present invention provides a computer readable medium of instructions for giving effect to any of the aforementioned methods or systems. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
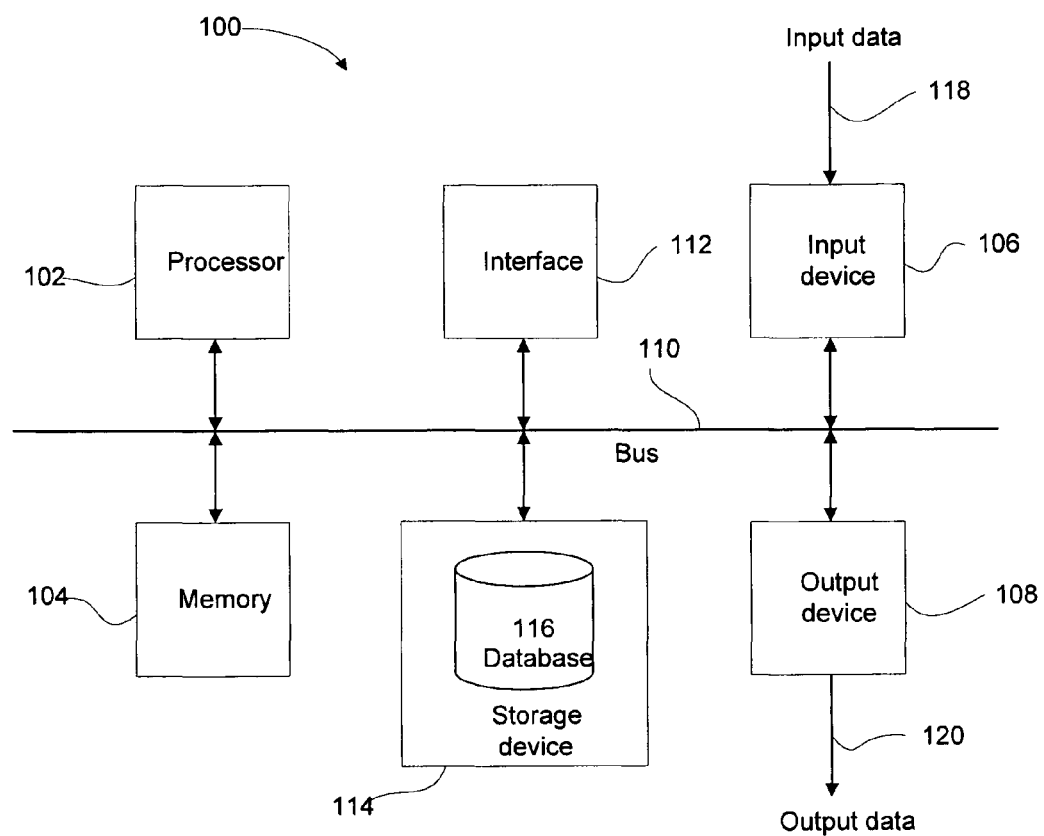
FIG. 1 illustrates a functional block diagram of an example of a processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1.

In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example volatile or non-volatile memory, solid state storage devices, magnetic devices, etc. The processor 102 could include more than one distinct processing device, for example to handle different functions within the processing system 100. Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 can be adapted to allow data or information to be stored in and/or retrieved from, via wired or wireless communication means, the at least one database 116. The interface 112 may allow wired and/or wireless communication between the processing unit 102 and peripheral components that may serve a specialised purpose.

The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server processing system, specialised hardware, or the like.

Figure 2:
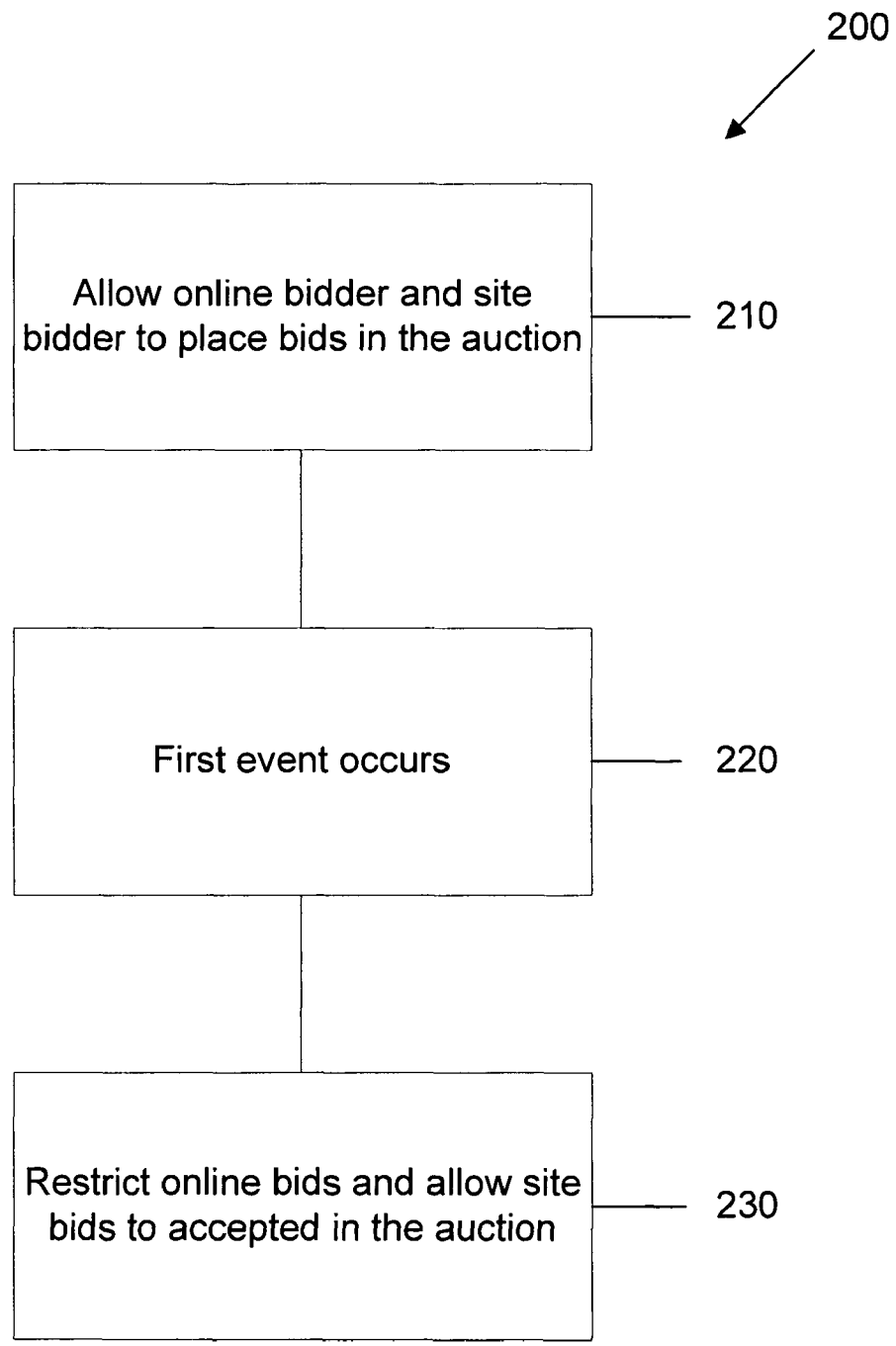
FIG. 2 illustrates a flow diagram illustrating an example method of conducting an auction having online and site bidders.

Referring to FIG. 2, there is shown a flow diagram illustrating an example method of conducting an auction having an online bidder and a site bidder.

In particular, at step 210, the method 200 includes allowing the online bidder 330 and/or the site bidder 340 to place one or more bids in the auction prior to a first event. The online bidder is able to place a bid in the auction via a client processing system 320 which is in communication with a server processing system 310. An auctioneer of the auction is able to accept a bid by the online bidder once the bid has been received by the server processing system 310.

At step 220, the first event occurs. At step 230, in response to the first event, the method 200 includes restricting, in the server processing system 310, a bid being placed by the online bidder in the auction and allowing a bid to be placed by the site bidder 340 in the auction. This arrangement restricts the situation where the online bidder places a bid using the client processing system 320 prior to the auction closing, but the server processing system 310 receives data indicative of the bid after the auction has closed.

Figure 3:
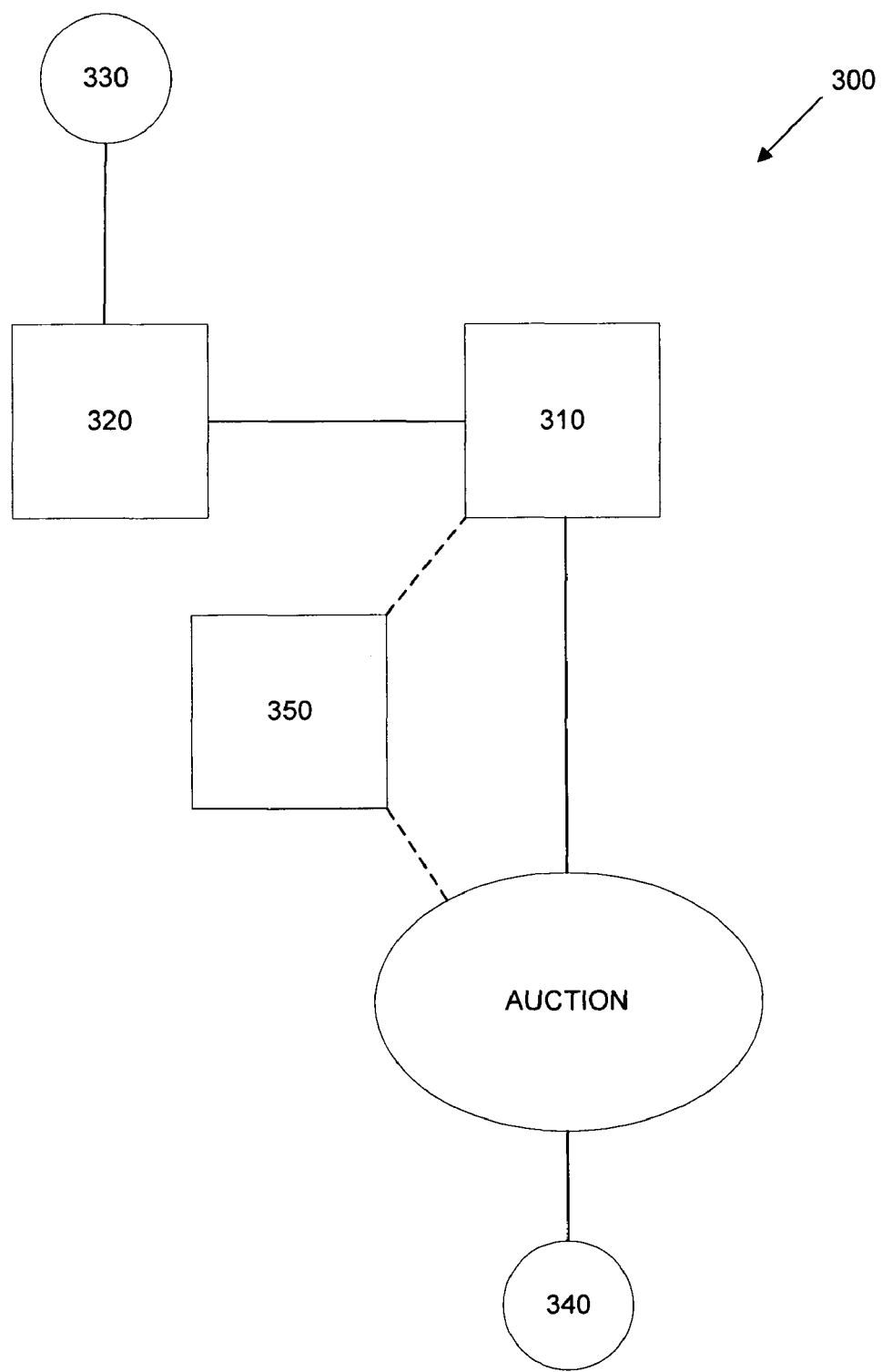
FIG. 3 illustrates a functional block diagram of an example system of conducting an auction having online and site bidders.

Referring now to FIG. 3, there is shown a block diagram illustrating an example system of conducting an auction having an online bidder 330 and a site bidder 340.

In particular, the system 300 includes the server processing system 310 in communication with the client processing system 320. The client processing system 320 and server processing system 310 are both forms of processing system 100.

In such a communications system 300, the client processing system 320 may be any type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a client processing system 320 to request and/or receive information or data can be provided by software, hardware and/or firmware. A client processing system may include or be associated with other devices, for example a local data storage device such as a hard disk drive or solid state drive.

The client processing system 320 allows an online bidder 330 to submit a bid in the auction, wherein the server processing system 310 receives data from the client processing system 320 indicative of the submitted bid. Generally, an auctioneer, or a representative thereof, is able to monitor bids received by the server processing system 310.

A site bidder 340 is able to compete against the online bidder 330 prior to a first event occurring in the auction. Once the first event has occurred, the server processing system 310 restricts a bid being placed by the online bidder 330 in the auction, whilst still allowing the site bidder 340 to place a bid in the auction. This arrangement restricts a situation where the online bidder 330 places a bid prior to the auction closing, but the bid is only received by the server processing system 310 after the auction has closed.

In one form, when a site bidder 340 submits a bid, the auctioneer, or representative thereof, inputs into the server processing system 310 that a bid has been accepted. Data is generated by the server processing system 310 and transferred to the client processing system 320 to indicate the status of the auction.

In an optional form, as indicated by the dotted outline in FIG. 3, the auctioneer, or representative thereof, may use an onsite processing system 350 which is in communication with the server processing system 310 to input the bid of the site bidder 340, wherein the onsite processing system 350 may be located at the site which the auction is being conducted. However, it will be appreciated that a onsite processing system 350 may not always be necessary, and as such the site bidder's bid may be directly provided to the server processing system 310 by the auctioneer, or representative thereof.

In another optional form, the onsite processing system 350 may be also configured to display, using a display device such as a television, a projector, a graphical displaying device or the like, the current accepted bid at the site. However, it will be appreciated that a separate first onsite processing system may be used to input the bid, and a separate second onsite processing system may be used to display the current accepted bid using the display device. It will also be appreciated that the first and second onsite processing systems may be in data communication with each other.

In one embodiment, the first event can be a first or second call announced by the auctioneer of the auction. For example, when the auctioneer announces the second call in the auction at the site, the auctioneer, or the representative thereof, inputs the occurrence of this first event into the server processing system 310 such that any bids which are submitted by the online bidder 330 after this first event are not accepted. However, as will be explained in more detail below, in response to a second event occurring after the first event, both the online bidder 330 and the site bidder 340 are able to bid again in the auction.

In another embodiment, the first event can be a time period after a particular auction notification in the auction, such as the first call. For example, when the auctioneer announces "first call", the auctioneer, or representative thereof, inputs into the server processing system 310 the occurrence of the auction notification. In response, the server processing system 310 generates data indicative of the auction notification occurring and a time period which a call can be placed by the online bidder 330 before bids are no longer accepted. Data indicative of the occurrence of the auction notification and the time period are transferred from the server processing system 310 to the client processing system 320 of the online bidder 330.

The client processing system 320 receives the data from the server processing system 310 and displays to the online bidder 330 a notification that the auction notification has occurred in the auction and that a time limit exists prior to the first event occurring. The time limit may be displayed to the user in the form of a countdown timer indicating the amount of time remaining before the online bidder 330 cannot submit an accepted bid in the auction. If no bid has been accepted, either from the online bidder 330 or the site bidder 340, within this time limit, then the first event occurs. After the first event occurs, the online bidder 330 cannot submit an accepted bid in the auction.

As initially indicated, in response to a second event occurring in the auction after the first event, both the online bidder 330 and the site bidder 340 are able to bid again in the auction until the first event occurs again. When the second event occurs in the auction, the server processing system 310 enables bids to be accepted from the online and site bidders 330, 340 until the first event occurs again.

In one form, the second event may be the acceptance of a bid from a site bidder 340 after the occurrence of the first event. In the example that the first event is the second call, the online bidders 330 are restricted from submitting an accepted bid when the second call occurs. Before the conclusion of the auction, a bid is accepted from the site bidder 340. The auctioneer or representative thereof, inputs into the server processing system 310 the occurrence of an accepted second bid, in this case being an accepted bid from the site bidder 340. In response, the server processing system 310 is enabled to accept bids from the online and site bidders 330, 340 until the first event occurs again in the auction.

In one form, the data displayed at the client processing system 320 is in the form of an interface, such as a web page. The web page provides input fields to allow the online bidder 330 to interact with the interface and submit a bid. When data indicative of a time limit prior to the first event is displayed at the client processing system 320, a countdown graphic/animation/text can be displayed to the online bidder 330. When the first event occurs, the server processing system 310 can cause the web page to refresh, indicating to the online bidder that the first event has occurred and that no bids are able to be submitted by the online bidder 330 unless a second event occurs.

Figure 4A:
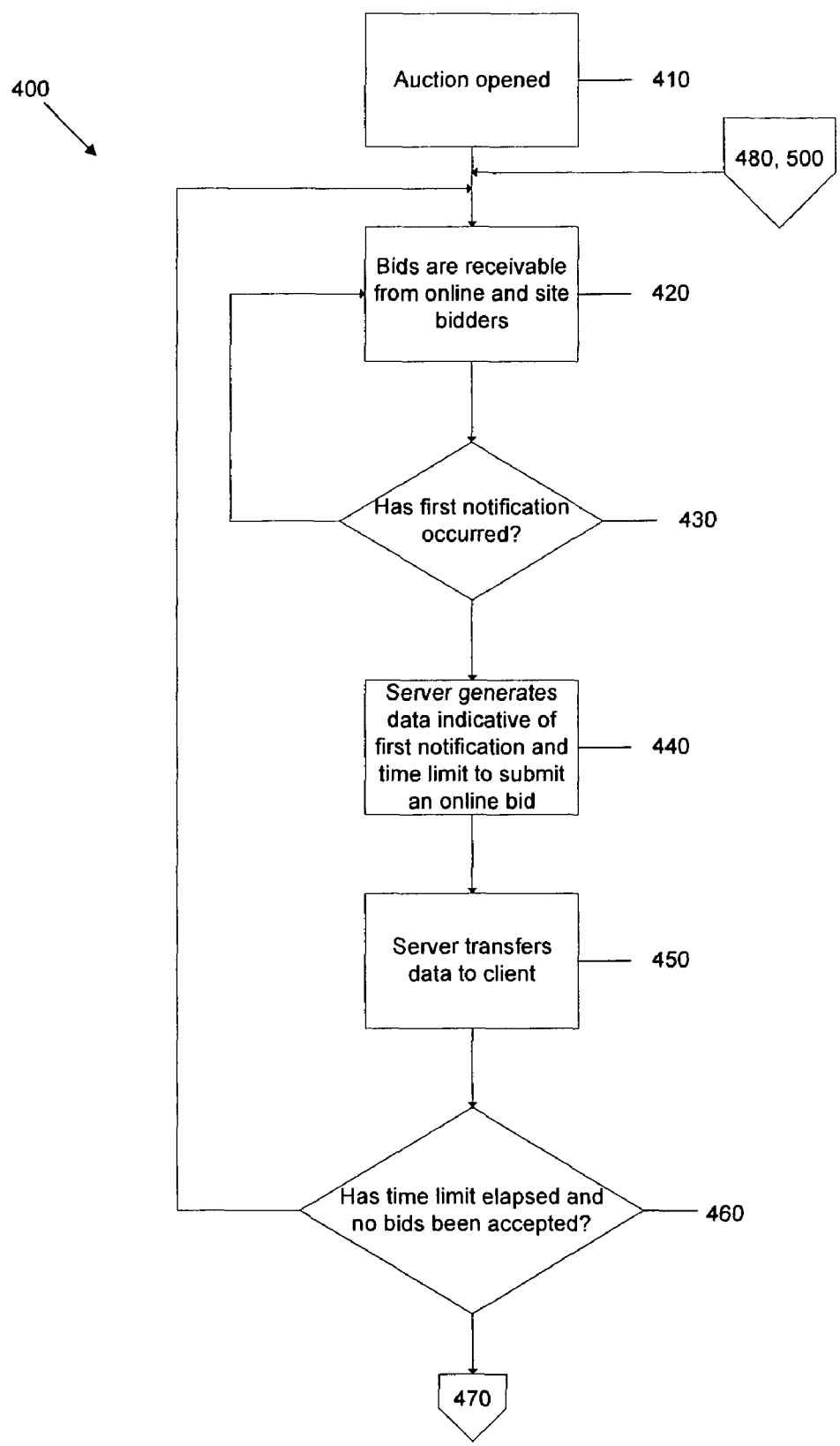
FIGS. 4A and 4B illustrate a flow diagram illustrating a more detailed example method of conducting an auction having online and site bidders.
Figure 4B:
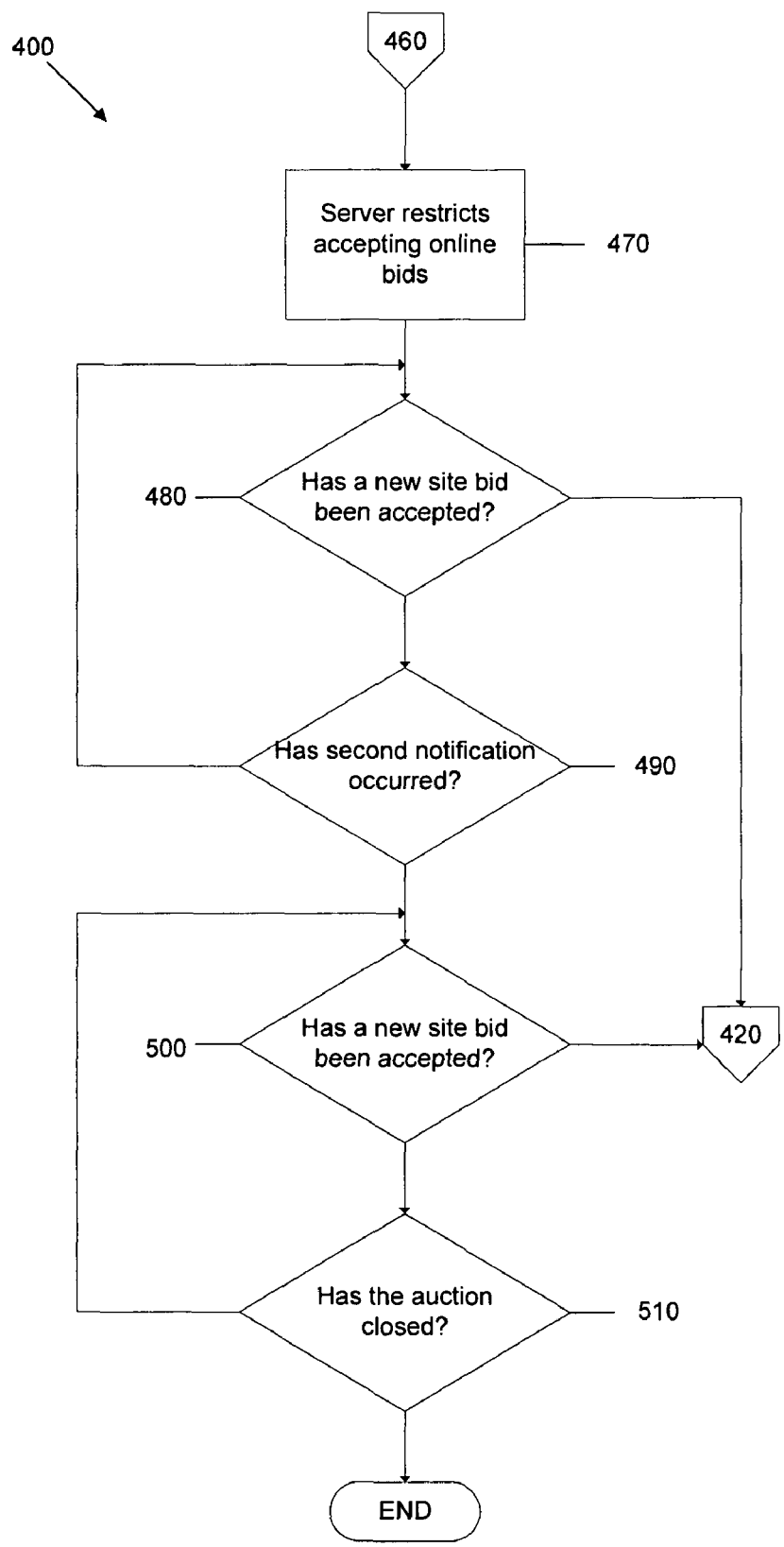

Referring now to FIGS. 4A and 4B, there is shown a flow diagram illustrating a more detailed example of conducting an auction having an online bidder 330 and a site bidder 340.

In particular, at step 410 the method 400 includes the auction being declared open. In one form, the auction may be only declared open for online bidder 330 until a particular event, such as an elapsed time period, occurs such that the auction is declared open for the site bidder 340. Alternatively, the auction is open substantially simultaneously for the online and site bidders 330, 340. When the auction is declared open, the server processing system 310 generates data indicative of an open status of the auction, which is transferred and displayed at the client processing system 320.

At step 420, bids from an online bidder and/or a site bidder are receivable.

When a site bid is received, the auctioneer, or representative thereof, inputs data into the server processing system 310 indicative of the accepted site bid. The display device can be in data communication with the server processing system 310. In response to the site bid, the server processing system 310 generates data indicating the value of the new bid which is transferred to the client processing system 320 and displayed to the online bidder 330. The server processing system 310 may also transfer data to an onsite processing system 350 or display device, such as a television, located at the site, wherein the onsite processing system 350 or display device displays the accepted site bid.

When data indicative of an online bid from an online bidder 330 is received by the server processing system 310 from the client processing system 320, the online bid is accepted in the auction so long as it was received prior to a time limit elapsing, as explained in more detail below. The server processing system 310 updates the current accepted bid and transfers data to the client processing system 320 and optionally to the onsite processing system 350 or display device indicating the accepted online bid. The auctioneer can generally announce that a new online bid has been received.

At step 430, the method continues accepting bids until a first notification. The first notification can be an auctioneer announcement to notify the site and online bidders of the progress of the auction. One form of auctioneer announcement may be a "first call" auctioneer announcement of the sequence of auctioneer announcements "first call, second call, third and final call, sold". It will be appreciated that other forms of auction notification sequences may be used by the auctioneer to progress the auction, such as "going, going, gone", "going once, going twice, sold", or other similar phrasing. The auctioneer or representative thereof, inputs into the server processing system 310, optionally via the onsite processing system 350, the occurrence of the first notification. This may include the auctioneer, or representative thereof, pressing a button displayed on an interface of the onsite processing system 350 using an input device.

At step 440, the server processing system 310 generates data indicative of the first notification and a countdown timer animation/graphic/text. The countdown timer may indicate that one minute, or any other appropriate time, remains in which a bid may be accepted by the server processing system 310 from an online bidder 330 before the online bidder 330 is restricted from bidding in the auction.

At step 450, the server processing system 310 transfers the data indicative of the first notification and the countdown timer to the client processing system 320. The client processing system 320 displays to the online bidder 330 that the first notification has occurred and the time in which a bid can be placed prior to being restricted from bidding.

At step 460, the method 400 includes the server processing system 310 determining if time limit has expired and that no bids have been accepted from the online bidder 330 or site bidder 340. If a bid has been accepted since the first notification then the method proceeds back to step 420 where bids can continue to be accepted from online and site bidders 330, 340 until the period of time elapses after the first notification being announced again. However, in the event that a bid was not received from the online bidder 330 and the site bidder 340 within the period of time after the first notification, the method proceeds to step 470.

At step 470 the server processing system 310 restricts accepting a bid submitted from the online bidder 330 via the client processing system 320. Data may be transferred to the client processing system 320 indicating to the online bidder 330 that the auction has a restricted status for online bids.

At step 480 and 490, if a bid is not accepted from a site bidder 340 prior to a second notification, such as a second call, the method proceeds to step 500. However, if a bid is received prior to the second notification, the method proceeds back to step 420 where the online bidder 330 and site bidder 340 are again able to compete in the auction. In response to the auctioneer, or representative thereof, providing input to the server processing system 310 regarding the new site bid, the server processing system 310 is enabled to receive bids from the online and site bidders 330, 340 again until the first event occurs. Data may be generated by the server processing system 310 and transferred to the client processing system 320 indicative of an open status of the auction allowing the online bidder 330 to place another online bid.

At steps 500 and 510, if a bid is not accepted from a site bidder 340 prior to auction closing, the method ends. However, if a bid is received from a site bidder 340 prior to the close of the auction, then the method 400 proceeds back to step 420 where both the online bidder 330 and site bidder 340 are able to bid in the auction again. In response to the auctioneer, or representative thereof, providing input regarding the new site bid, the server processing system 310 is enabled to receive bids from the online bidder 330 again until the first event occurs. Data may be generated by the server processing system 310 and transferred to the client processing system 320 indicative of an open status of the auction allowing the online bidder 330 to place another online bid.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a single online bidder 330 and single site bidder 340 have been described, it will be appreciated that a plurality of online bidders 330 and/or a plurality of site bidders 340 may be able to participate in the auction described.

It will also be appreciated that online bidders may require to enter a user name and password in order to receive data relating to the auction described above. The server processing system may use a database 116 in order to verify the user name and password in order to allow the online bidder to participate in the auction described above.

In another optional form, the client processing system of the online bidder may receive audio and/or visual data indicative of the site auction. In particular, a microphone may record audio data which is transferred to the server processing system and streamed to one or more online bidders. Additionally, a video camera, such as a webcam, may be used to record visual data which is transferred to the server processing system and streamed to one or more online bidders. In one form the microphone may be a Bluetooth microphone which is worn by the auctioneer. In an additional or alternate form the video camera may record visual data indicative of the auctioneer conducting the auction. The interface displayed on the client processing system can provide a hyperlink to enable the online bidder to selectively receive the streaming audio and/or visual data. In one form, the microphone and/or video camera are in data communication with the processing system 350 which enables transfer of the data to the server processing system.

In another optional embodiment, the interface displayed on the client processing system can provide data indicative of a bid history. In particular, a hyperlink may be displayed by the interface which allows an online bidder to selectively review the history of the one or more bids and the status of each bid (i.e. whether a particular bid is pending or whether a particular bid has been accepted). Upon selection of the hyperlink, the bid history is displayed to the user with the respective statuses of each bid for the respective auction.

The embodiments illustrated may be implemented as a software package or component. Various embodiments can be implemented for use with the Microsoft Windows operating system or any other modern operating system. The embodiments described throughout can also be implemented via hardware, or a combination of hardware and software.

Although a preferred embodiment has been described in detail, it should be understood that various changes, substitutions, and alterations can be made by one of ordinary skill in the art without departing from the scope of the present invention.

The invention claimed is:

1. A method of facilitating an auction being conducted having a plurality of online bidders and a site bidder, wherein a comprising:

receiving, by a server processing system in communication with a respective client processing system for each online bidder, one or more online bids from one of the plurality of online bidders, via the respective client processing system, for acceptance prior to a first event, and wherein the each online bidder is able to submit more than one online bid to compete in the auction;

restricting, by the server processing system, online bids from being accepted from the plurality of online bidders in the auction in response to the first event whilst the site bidder is able to place an on-site bid in the auction; and allowing one or more of the plurality of online bidders to submit one or more online bids in response to a second event occurring after the first event.

2. A server processing system for conducting an auction having a plurality of online bidders and a site bidder, the server processing system being in data communication with a respective client processing system for each online bidder and configured to:

receive one or more online bids from one of the plurality of online bidders, via the respective client processing system, for acceptance prior to a first event, each online bidder able to submit more than one online bid to compete in the auction;

restrict online bids from being accepted from the plurality of online bidders in the auction in response to the first event whilst the site bidder is able to place an on-site bid in the auction; and allowing one or more of the plurality of online bidders to submit one or more online bids in response to a second event occurring after the first event.

3. The server processing system according to claim 2, wherein the server processing system is configured to restrict the plurality of online bidders from submitting one or more online bids in response to the first event occurring after the second event.

4. The server processing system according to claim 2, wherein the second event is the on-site bid being received from the site bidder after the first event.

5. The server processing system according to claim 2, wherein the first event is an auction notification during the auction, wherein the server processing system is configured to, receive input data indicative of the auction notification; and
restrict the online bids from being accepted after receiving the input data.

6. The server processing system according to claim 2, wherein the first event is a period of time after an auction notification during the auction, wherein the server processing system is configured to, receive input data indicative of the auction notification; and
restrict the online bids from being accepted from the plurality of online bidders in the auction after the period of time has elapsed since receiving the input data.

7. The server processing system according to claim 6, wherein the auction notification is an auctioneer announcement during the auction.

8. The server processing system according to claim 6, wherein the server processing system is configured to transfer, to each client processing system, data indicative that the auction notification occurred.

9. The server processing system according to claim 8, wherein the server processing system is configured to transfer, to each client processing system, data indicative of the period of time.

10. The server processing system according to claim 9, wherein the server processing system is configured to transfer, to each client processing system, data indicative of a period of time remaining prior to online bids being restricted from being accepted from the plurality of online bidders.

11. The server processing system according to claim 10, wherein the server processing system is configured to transfer, to each client processing system, data indicative of at least one of textual information and graphical information indicating the period of time remaining.

12. The server processing system according to claim 2, wherein the server processing system is configured to transfer to each client processing system, data indicative of the auction being opened.

13. The server processing system according to claim 12, wherein the server processing system is configured to transfer the data indicative of the auction opening simultaneously with the auction being opened on site.

14. The server processing system according to claim 12, wherein the server processing system is configured to transfer the data indicative of the auction opening a period of time after the auction has opened on site.

15. A computer program product including a non-transitory computer readable storage medium having a computer program recorded therein or thereon, the computer program enabling facilitation of conducting an auction having a plurality of online bidders and a site bidder, the computer program product containing computer program codes that, when run on a server processing system, configure the server processing system to:
  receive one or more online bids from one of the plurality of bidders, via a respective client processing system, for acceptance prior to a first event, each online bidder able to submit more than one online bid to compete in the auction;
  restrict online bids from being accepted from the plurality of online bidders in the auction in response to the first event whilst the site bidder is able to place an on-site bid in the auction; and
  allow one or more of the plurality of online bidders to submit one or more online bids in response to a second event occurring after the first event.

16. A system for conducting an auction having a plurality of online bidders and a site bidder, the system comprising:
  a server processing system configured to communicate with a respective client processing system for each online bidder, receive one or more online bids from one of the plurality of online bidders for acceptance, restrict online bids from being accepted from the plurality of online bidders in the auction in response to a first event whilst the site bidder is able to place an on site bid in the auction, and allow one or more of the plurality of online bidders to submit one or more online bids in response to a second event occurring after the first event,
  wherein each respective client processing system is configured to be used by a respective online bidder prior to the first event and each online bidder is able to submit more than one online bid to compete in the auction.

17. The system according to claim 16, wherein the system includes a display device in communication with the server processing system and located on site, the display device configured to display an accepted bid during the auction.

18. The system according to claim 17, wherein the display device is at least one of:
  a television;
  a projector; and
  a graphical displaying device.

* * * * *